Dec. 27, 1932. E. RABINOWITSCH 1,892,076

PROCESS RELATING TO BAKING AND DOUGH MAKING

Filed May 21, 1931

INVENTOR:
E. Rabinowitsch
BY
Emil Bönnelycke
ATTORNEY.

Patented Dec. 27, 1932

1,892,076

UNITED STATES PATENT OFFICE

EFRAIM RABINOWITSCH, OF PARIS, FRANCE, ASSIGNOR OF ONE-HALF TO EUGEN RIVOCHE, OF PARIS, FRANCE

PROCESS RELATING TO BAKING AND DOUGH-MAKING

Application filed May 21, 1931, Serial No. 539,068, and in Germany May 24, 1930.

The known processes for directly producing wholemeal dough from grain have various drawbacks.

If the grain is directly employed for the production of wholemeal or wholemeal dough, a dough is obtained in which the hulls of the grain are only mechanically disintegrated and the peripheral layers of the grain cannot be utilized.

When the grain has been treated to a softening process, subsequent germination, and after that to the production of wholemeal dough, a dough is obtained which cannot comply with the technical baking requirements, because the constituents of the grain, which act as enzymes, are only rendered active when the carbohydrates have been already almost completely decomposed to sugar and the endosperm has absolutely lost all the technical properties required in baking.

The object of the present invention is to obviate all these drawbacks, and the new process differs from those previously known in the following respects:

1. All the advantages associated with the germination of the grain are obtained by causing the constituents acting as enzymes (not germination) to be rendered active artificially, and, consequently, not only are the technical drawbacks in baking obviated, but the considerable loss in the dry material is completely avoided.

2. The time required for the conversion of the grain to bread is reduced to from 8 to 12 hours. The period of fermentation is reduced to 1.5 to 2 hours by the application of a high and continuously increasing pressure, the acidity of the dough is reduced, and the loss of dry substance due to the fermentation is obviated.

3. The treated dough is completely free from spores of spouth by the high and continuously increasing pressure, so that the spontaneous fermentation, acetic and butyric acids fermentation are completely excluded.

4. The peripheral layers in which the valuable plasma substances are stored are opened up by the large difference of pressure and the valuable proteins, lipoids and vitamins thereby made available.

5. The new process enables the whole grain to be utilized for making bread or dough, complying with all the technical requirements of the baking process and conforming to the modern food principles.

All these advantages are attained by the artificial activation of the constituents of the grain acting as enzymes and the subsequent means for opening all the cells of the grain.

An example of apparatus adapted for carrying out the process according to the invention is shown in the accompanying drawing in which—

Figure 1:
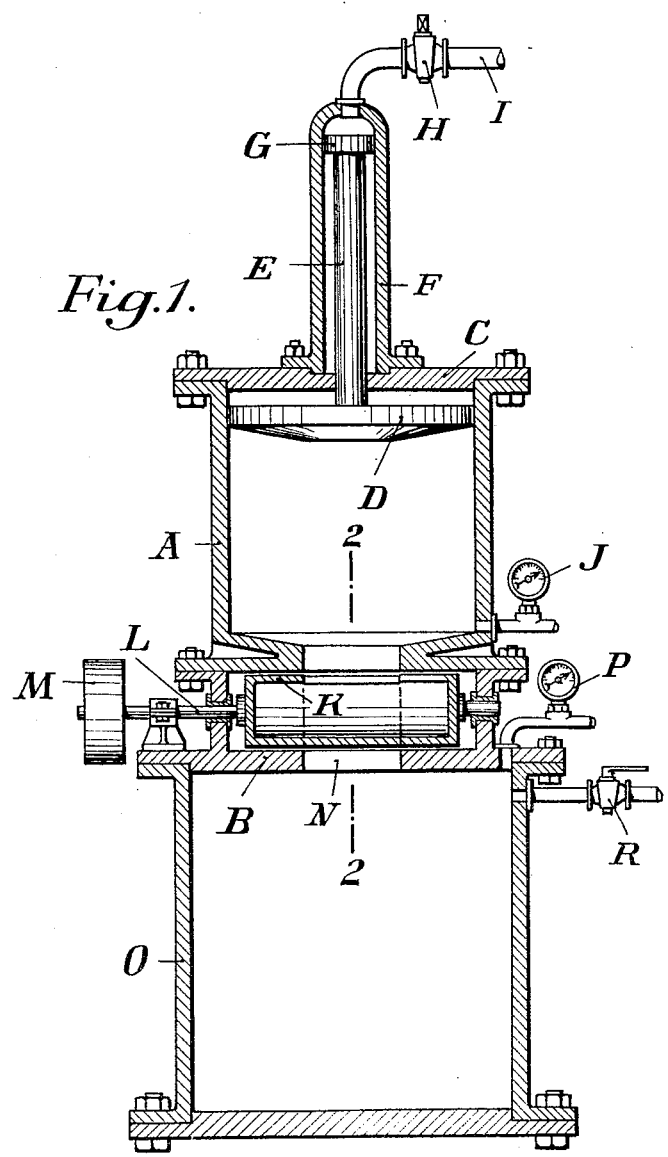
Fig. 1 is a longitudinal section through the apparatus.
Figure 2:
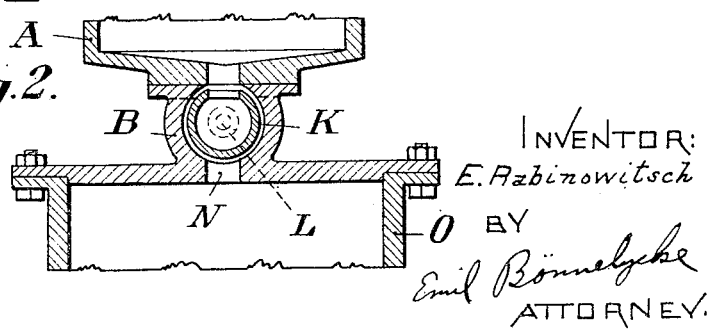
Fig. 2 is a section on the lines 2—2 of Fig. 1.

The natural germination of the grain precedes the swelling lasting with the unhulled cereals about 24 to 36 hours. The various reactions connected with the germination of the grain are effected by the swelling which is dependent on the temperature of the water and the constitution of the grain. Since, as is known, the aleurons layer with its large, protecting, fat-containing cells does not surround the embryo, the water penetrates through the envelope of the grain into the space containing the embryo where there is a large number of albumen-containing cells of the cylinder epithelium collected at the side of the cotyledon turned towards the endosperm. The loose structure of the cells, which during the ripening of the grain, changes, by the loss of water, from the sol to the gel condition, is shrunk, and during the swelling of the grain is gradually impregnated by the water entering during the germination. The cells begin to swell and their surface is increased. They act, on attaining a certain surface tension, as enzymes. The best effect is obtained, however, during the later germination of the grain and at the time in which the carbohydrates are decomposed to sugar and the gluten of the endosperm has lost completely the technical properties of baking.

In the process according to the invention, the swelling and germination of the grain are effected, not only with a reduction in the 72 hours formerly required, but also the germination itself, which, as is known, acts unfavourably on the condition and baking properties of the gluten is completely obviated. On the other hand, the constituents acting as enzymes are rendered more active.

In carrying out the process, the dry cleansed grain, with water treated with lactic acid, to which 2.5 per cent. of NaCl is added, is introduced into a vessel and exposed therein to a high continuously increasing pressure. The water penetrates into the embryo and soon after the cells of the cylinder epithelium are caused to swell. When a certain pressure, dependent on the kind and property of the grain, is attained, the constituents of the grain acting as enzymes are rendered active. In this way, the enzyme effect of fermentation due to the constituents present in the grain is attained without the grain undergoing germination.

The grain treated in this way is transferred to a kneading machine in which it is worked to a homogeneous dough. To the dough 0.5 per cent. of glycerine and lime water are added. The dough is then transferred into the apparatus of which an example is shown in the drawing, serving for opening up the cells. The substance is then exposed repeatedly to a high, continuously increasing pressure and then to continuous or intermittent partial vacuum.

By this alternating pressure, the whole of the cells of the grain are opened up, the hulls disintegrated and comminuted and partly reduced to lower carbohydrates. In this way by the process according to the invention, a wholemeal dough is produced, which complies not only with the modern food principles, but also to all the technical requirements of baking.

Since the whole duration of the treatment of the grain only amounts to 8 to 12 hours (including the baking process) there is not only a considerable economy of time (previously amounting to 64 to 88 hours), but, also, at least 10 to 13 per cent. of the dry material, which otherwise would be unavoidably lost, is saved. (During the softening and germination process, the loss in dry material by leaching and changes due to fermentation amounts to 6 to 9 per cent. and during the long continued fermentation a further 3–4 per cent. of the dry substance is lost).

The apparatus shown by way of example for carrying out the process consists of a cylinder A which is connected in the manner of a funnel with a cylinder B of which the axis is arranged in the transverse direction. The cylinder A has a cover C, through the centre of which the rod E of a piston D extends, the rod reciprocating in the hermetically closed cylinder A. The piston rod E is connected to a piston G sliding in a tubular guide F. The guide F is rigidly connected with the cover C and with a pipe I provided with a valve H. At the bottom of the cylinder A there is a manometer J. A cylinder K arranged air-tight in the cylinder B and a shaft L extends through the base of the cylinder K. A pulley M, secured on the shaft L, is adapted to rotate the cylinder K within the cylinder B. Below the cylinder B there is a vertical cylinder O connected by a tube R with a suction pump. A pressure gauge P is provided at the cylinder O.

After the dry cleansed grain has been worked in the manner described above, it passes into the kneading machine in which it is worked up to a homogeneous dough. The cylinder A is filled with the dough after a suitable quantity of NaCl, glycerine and lime water has been added. The cover C is then fastened and the guide F connected through the tube I with a compressor. On opening the valve H, the piston D is gradually depressed by the piston G, until a pressure of about 20 atms. is exerted on the dough. The dough passes through the opening N into the cylinder K in which it is exposed to the same pressure.

On rotating the pulley M, the dough is delivered from the cylinder K into the cylinder O, as soon as the opening N is opposite the cylinder O. The dough is, consequently, now exposed to the partial vacuum obtaining in cylinder O. All the cells of the grain are explosively opened by the difference of pressure.

When the cells have been opened, the dough is baked to wholemeal bread in the usual manner.

The new process is adapted not only for all kinds and types of grains used in the preparation of bread, but also for grains already milled to meal, bran or wholemeal flour.

In such case, the meal, bran or wholemeal flour is mixed with a corresponding quantity of a diastase and with water to which 2.5 per cent. of NaCl and lactic acid are added, mixed by stirring to a soft dough, whereupon the material obtained in this way is exposed to a high, continuously increasing pressure and then to a continuous or intermittent partial vacuum.

By the treatment of bran and other substances rich in protein according to the process of the invention these materials are obtained for the purposes of nutriment and fodder in a highly absorbable form.

The apparatus has been claimed in a co-pending divisional application, Serial No. 629,951, filed August 22, 1932.

What I claim is:

1. In a process for rendering active the constituents of cereals acting as enzymes, and for opening up the cells of grain for making dough and baking purposes, dry cleansing said grain and repeatedly exposing said grain to a high continuously increasing pressure and then to continuous or a partial vacuum, to effect a disruptive opening of the cells of said grain.

2. In a process for rendering active the constituents of cereals acting as enzymes, and for opening up the cells of grain for making dough and baking purposes, dry cleansing said grain, adding lactic acid, NaCl, glycerine and lime water to the said grain and repeatedly exposing said grain to a high continuously increasing pressure and then to a partial vacuum, to effect a disruptive opening of the cells of said grain.

In testimony whereof I have affixed my signature.

EFRAIM RABINOWITSCH.